United States Patent
Li et al.

(10) Patent No.: US 12,040,741 B2
(45) Date of Patent: Jul. 16, 2024

(54) PHOTOVOLTAIC TILE, PHOTOVOLTAIC POWER GENERATION SYSTEM, AND METHOD FOR MOUNTING PHOTOVOLTAIC TILE

(71) Applicants: ZHEJIANG JINKO SOLAR CO., LTD., Zhejiang (CN); JINKO SOLAR CO., LTD., Jiangxi (CN)

(72) Inventors: Bo Li, Zhejiang (CN); Pengjun Xiao, Zhejiang (CN); Juan Wang, Zhejiang (CN); Sen Yang, Zhejiang (CN); Chunhua Tao, Zhejiang (CN); Ning Li, Zhejiang (CN); Rong Hu, Zhejiang (CN); Na Liu, Zhejiang (CN); Yunchao Diao, Zhejiang (CN); Zhinan Zhao, Zhejiang (CN)

(73) Assignees: Zhejiang Jinko Solar Co., Ltd., Zhejiang (CN); Jinko Solar Co., Ltd., Jiangxi (CN)

( * ) Notice: Subject to any disclaimer, the term of this patent is extended or adjusted under 35 U.S.C. 154(b) by 0 days.

(21) Appl. No.: 17/968,543

(22) Filed: Oct. 18, 2022

(65) Prior Publication Data
US 2023/0421095 A1    Dec. 28, 2023

(30) Foreign Application Priority Data

Jun. 27, 2022    (CN) .......................... 202210741369.2
Jun. 27, 2022    (CN) .......................... 202210742337.4
(Continued)

(51) Int. Cl.
*H02S 30/20*    (2014.01)
*H02S 20/25*    (2014.01)
(Continued)

(52) U.S. Cl.
CPC .............. *H02S 30/20* (2014.12); *H02S 20/25* (2014.12); *F24S 2025/015* (2018.05);
(Continued)

(58) Field of Classification Search
CPC .......... H02S 30/20; H02S 20/25; H02S 30/00; H02S 20/23; Y02B 10/10; Y02E 10/50;
(Continued)

(56) References Cited

U.S. PATENT DOCUMENTS

| | | | |
|---|---|---|---|
| 6,201,179 B1 | 3/2001 | Dalacu | |
| 2011/0162639 A1* | 7/2011 | Jeandeaud | ............. F24S 25/40 126/634 |

FOREIGN PATENT DOCUMENTS

| | | |
|---|---|---|
| CN | 202544248 U | 11/2012 |
| CN | 207475449 U | 6/2018 |

(Continued)

OTHER PUBLICATIONS

Office Action received in Chinese Application No. 2022107413692 dated Jun. 25, 2023 in 9 pp.
(Continued)

*Primary Examiner* — Michael Y Sun
(74) *Attorney, Agent, or Firm* — Knobbe Martens Olson & Bear LLP

(57) ABSTRACT

A photovoltaic tile, a photovoltaic power generation system, and a method for mounting photovoltaic tile. The photovoltaic tile includes color steel tiles, adjacent color steel tiles are fixedly connected to each other, the color steel tiles each include a male rib, a female rib, and a folding portion, the male rib and the female rib are respectively arranged at two opposite ends of the color steel tile along a width direction, the folding portion is arranged between the male rib and the female rib, and the female rib is fixedly connected to the male rib of an adjacent color steel tile to form a connecting
(Continued)

end; fixing devices mounted on the folding portions; and photovoltaic modules each having two ends respectively connected to the fixing devices of adjacent folding portions. When the photovoltaic module is mounted on the color steel tile, the connecting end supports the photovoltaic module.

14 Claims, 6 Drawing Sheets

(30) Foreign Application Priority Data

Jun. 27, 2022 (CN) .......................... 202210743994.0
Jun. 27, 2022 (CN) .......................... 202221635366.2

(51) Int. Cl.
  *F24S 25/00* (2018.01)
  *F24S 25/40* (2018.01)
  *F24S 25/67* (2018.01)
  *H02S 20/23* (2014.01)

(52) U.S. Cl.
  CPC .......... *F24S 2025/023* (2018.05); *F24S 25/40* (2018.05); *F24S 25/67* (2018.05); *H02S 20/23* (2014.12); *Y02B 10/10* (2013.01); *Y02E 10/47* (2013.01); *Y02E 10/50* (2013.01); *Y10T 29/49355* (2015.01); *Y10T 29/49826* (2015.01)

(58) Field of Classification Search
  CPC . Y02E 10/47; F24S 25/40; F24S 25/67; F24S 2025/015; F24S 2025/023; Y10T 29/49355; Y10T 29/49826
  See application file for complete search history.

(56) References Cited

FOREIGN PATENT DOCUMENTS

| CN | 108716258 A | 10/2018 |
| CN | 108824707 A | 11/2018 |
| CN | 211080801 U | 7/2020 |
| CN | 212689434 U | 3/2021 |
| CN | 213626319 U | 7/2021 |
| CN | 215054688 U | 12/2021 |
| CN | 114232900 A | 3/2022 |
| CN | 215934770 U | 3/2022 |
| CN | 114268270 A | 4/2022 |
| CN | 114503427 A | 5/2022 |
| CN | 114567235 A | 5/2022 |
| CN | 216451306 A * | 5/2022 |
| CN | 114585788 A | 6/2022 |
| CN | 216681263 U | 6/2022 |
| DE | 20108106 U1 | 2/2002 |
| JP | 2012167455 A | 9/2012 |

OTHER PUBLICATIONS

Office Action received in Chinese Application No. 2022107423374 dated Jun. 15, 2023 in 11 pp.
European Search Report received in U.S. Appl. No. 22/198,836 dated May 9, 2023 in 9 pp.

* cited by examiner

PHOTOVOLTAIC TILE, PHOTOVOLTAIC POWER GENERATION SYSTEM, AND METHOD FOR MOUNTING PHOTOVOLTAIC TILE

CROSS-REFERENCE TO RELATED APPLICATIONS

The present application claims priority to Chinese Patent Application No. 202210743994.0, filed on Jun. 27, 2022, Chinese Patent Application No. 202221635366.2, filed on Jun. 27, 2022, Chinese Patent Application No. 202210741369.2, filed on Jun. 27, 2022, and Chinese Patent Application No. 202210742337.4, filed on Jun. 27, 2022, the disclosures of which are all incorporated herein by reference in their entireties.

TECHNICAL FIELD

The present disclosure relates to the field of photovoltaic technologies, and in particular, to a photovoltaic tile, a photovoltaic power generation system, and a method for mounting photovoltaic tile.

BACKGROUND

A solar photovoltaic power generation system utilizes solar energy, and includes electronic devices made of special materials such as silicon panels and inverters. The solar photovoltaic power generation system is connected to a power grid and delivers electricity to the power grid. The solar photovoltaic power generation system is mounted on rooftop of buildings such as plants and warehouses of production enterprises. A specific mounting form involves mounting color steel tiles on the rooftop, and fixedly mounting a photovoltaic module of the solar photovoltaic power generation system with the color steel tiles. In the related art, two ends of the photovoltaic module are stably connected to the color steel tiles. When the photovoltaic module has a large size (e.g., a photovoltaic module of Model 210), the color steel tiles have insufficient support force on the photovoltaic module. When rain or snow aggregates on the photovoltaic module, the photovoltaic module is easily bent and deformed or even damaged.

SUMMARY

The present disclosure provides a photovoltaic tile, a photovoltaic power generation system, and a method for mounting photovoltaic tile to solve the problems of high mounting costs of and easy damages to the photovoltaic tile.

The present disclosure provides a photovoltaic tile, including: color steel tiles, adjacent color steel tiles of the color steel tiles are fixedly connected to each other, the color steel tiles each include a male rib, a female rib, and a folding portion, the male rib and the female rib are respectively arranged at two opposite ends of the color steel tile along a width direction, the folding portion is arranged between the male rib and the female rib, and the female rib is fixedly connected to the male rib of an adjacent color steel tile to form a connecting end; fixing devices mounted on the folding portions; and photovoltaic modules each having two ends respectively connected to the fixing devices of adjacent folding portions. When the photovoltaic module is mounted on the color steel tile, the connecting end supports the photovoltaic module.

In one or more embodiments, the connecting end is provided with a connecting plane extending along the width direction of the color steel tile, and when the photovoltaic module is mounted on the color steel tile, the connecting plane is connected to the photovoltaic module.

In one or more embodiments, a width L of the connecting plane satisfies: 5 mm≤L≤30 mm.

In one or more embodiments, along a length direction of the color steel tile, a projection of the connecting end is in a T shape, an L shape, or a U shape.

In one or more embodiments, the female rib is fixedly connected to the male rib of an adjacent color steel tile by an overlocking; and an angle α of the overlocking satisfies: 360°≤α≤540°.

In one or more embodiments, the photovoltaic tile further includes a partition plate arranged between the photovoltaic module and the color steel tile, and the partition plate is mounted on the photovoltaic module, and/or the partition plate is mounted on the color steel tile.

In one or more embodiments, the fixing device includes a first clamping portion, the first clamping portion includes a first clamping body and a second clamping body arranged opposite to each other along the width direction of the color steel tile, the first clamping body and the second clamping body are configured to clamp the folding portion so that the fixing device is mounted on the folding portion.

In one or more embodiments, the first clamping body includes a first bending structure, the second clamping body includes a second bending structure, and the first clamping body and the second clamping body enclose to define a first clamping space; the folding portion includes a first sidewall and a second sidewall arranged opposite to each other along the width direction of the color steel tile; and when the fixing device is connected to the folding portion, a part of the folding portion is located in the first clamping space, the first bending structure abuts against the first sidewall, and the second bending structure abuts against the second sidewall.

In one or more embodiments, an outer contour of the first bending structure matches an outer contour of the first sidewall, and an outer contour of the second bending structure matches an outer contour of the second sidewall.

In one or more embodiments, the first clamping body further includes a third extension portion located on the side of the first bending structure adjacent to the color steel tile, and the third extension portion and the first bending structure jointly form a preset angle; the second clamping body further includes a fourth extension portion located on the side of the second bending structure close to the color steel tile, and the fourth extension portion and the second bending structure jointly form a preset angle; and when the fixing device is connected to the folding portion, the third extension portion and the fourth extension portion abut against the color steel tile.

In one or more embodiments, the first clamping body further includes a first extension portion extending along a height direction of the color steel tile, and the second clamping body further includes a second extension portion extending along the height direction of the color steel tile; and the fixing device further includes a first fastener, and the first extension portion is connected to the second extension portion through the first fastener.

In one or more embodiments, the fixing device further includes a second clamping portion arranged on the first clamping body and/or the second clamping body, the second clamping portion is provided with a first clip and a second clip arranged along the height direction of the color steel tile, the first clip and the second clip are configured to clamp the photovoltaic module; and the fixing device further includes a second fastener, and the first clip is connected to the second clip through the second fastener.

In one or more embodiments, the photovoltaic module includes a first solar cell string, a second solar cell string, and a third solar cell string, a jumper wire is arranged between the first solar cell string and the second solar cell string or between the second solar cell string and the third solar cell string.

In a second aspect of the present disclosure, a photovoltaic power generation system is provided, including: the photovoltaic tile as described above; a first support including one end fixedly connected to ground or a building main body and another end connected to the folding portion of the color steel tile, to mount the photovoltaic tile on the ground or the building main body; and a fixing device connected to the side of the folding portion away from the first support along a thickness direction of the color steel tile, and the fixing device is configured to clamp a joint between the first support and the folding portion.

In one or more embodiments, the first support includes a bending portion and a first mounting portion, the first support is connected to the folding portion through the bending portion, and the first support is connected to the ground or the building main body through the first mounting portion; and when the first support is connected to the color steel tile, at least a part of the bending portion is located in the folding portion and abuts against an inner wall of the folding portion.

In one or more embodiments, the color steel tile includes a male rib and a female rib, the male rib and the female rib are respectively arranged at two opposite ends of the color steel tile along a width direction, and the female rib being fixedly connected to the male rib of an adjacent color steel tile to form a connecting end. The photovoltaic power generation system further includes a second support, the second support includes one end fixedly connected to the connecting end and another end fixedly connected to the ground or the building main body. The second support includes a fixing bracket and a second mounting portion, the fixing bracket is configured to be connected to the ground or the building main body, and the second mounting portion includes one end connected to the main body and another end fixedly connected to the male rib and the female rib by an overlocking. The second support includes a fixing bracket and a second mounting portion, the fixing bracket being configured to be connected to the ground or the building main body, the second mounting portion having one end connected to the main body and the other end fixedly connected to the male rib and the female rib by overlocking. The second mounting portion is movably connected to the fixing bracket.

In a third aspect of the present disclosure, a method for mounting photovoltaic tile is provided, for mounting the photovoltaic tile as described above. The photovoltaic tile includes a plurality of color steel tiles, photovoltaic modules, and fixing devices, the color steel tiles each have one end provided with a male rib and another end provided with a female rib, a folding portion is arranged between the male rib and the female rib. The method for mounting photovoltaic tile includes: lapping the female rib of one of adjacent color steel tiles on the male rib of another one of the adjacent color steel tiles, jointly bending the male rib and the female rib one or more times through an overlocking means to form a connecting end; mounting the fixing devices on adjacent folding portions, respectively; and mounting the photovoltaic modules on adjacent fixing devices.

In one or more embodiments, prior to the mounting the fixing devices on adjacent folding portions or mounting the photovoltaic modules on adjacent fixing devices, the mounting method includes: gluing a partition plate to the photovoltaic module along a length direction of the color steel tile.

In one or more embodiments, during the lapping the female rib of one of adjacent color steel tiles on the male rib of another one of the adjacent color steel tiles, jointly bending the male rib and the female rib one or more times through an overlocking means to form a connecting end, the method includes: jointly bending and connecting a second support of a roof with the male rib and the female rib to form the connecting end.

In one or more embodiments, during the lapping the female rib of one of adjacent color steel tiles on the male rib of another one of the adjacent color steel tiles, jointly bending the male rib and the female rib one or more times through an overlocking means to form a connecting end, the method includes: engaging one end of a first support of the roof with the folding portion, and fixedly connecting the other end of the first support to the roof.

It should be understood that the general description above and the detailed description in the following are merely exemplary and illustrative, and cannot limit the present disclosure.

Figure 1:
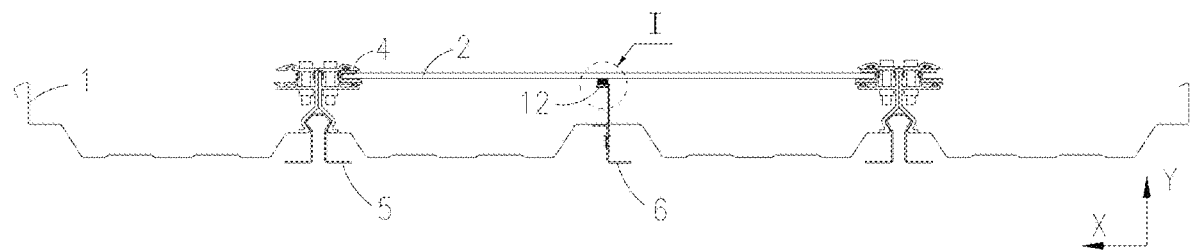
FIG. 1 is a schematic structural diagram of a photovoltaic tile according to one or more embodiments of the present disclosure.

The accompanying drawings herein, which are incorporated in and constitute a part of this specification, illustrate embodiments consistent with the present disclosure and, together with the specification, serve to explain principles of the present disclosure.

DESCRIPTION OF EMBODIMENTS

In order to better understand the technical solution of the present disclosure, embodiments of the present disclosure are described in detail below with reference to the accompanying drawings.

It should be made clear that the embodiments described are only some rather than all of the embodiments of the present disclosure. All other embodiments acquired by those of ordinary skill in the art without creative efforts based on the embodiments of the present disclosure fall within the protection scope of the present disclosure.

The terms used in the embodiments of the present disclosure are intended solely to describe particular embodiments and are not intended to limit the present disclosure. As used in the specification of the present disclosure and the appended claims, the singular forms of "a/an", "one", and "the" are intended to include plural forms, unless otherwise clearly specified in the context.

It should be understood that the term "and/or" used herein only describes an association relationship between associated objects and represents that three relationships may exist. For example, A and/or B may represent the following three cases: only A exists, both A and B exist, and only B exists. In addition, the character "/" herein generally means that associated objects before and after it are in an "or" relationship.

It is to be noted that positional terms such as "above", "below", "left", and "right" described in the embodiments of the present disclosure are described from the perspective shown in the drawings and should not be construed as limiting the embodiments of the present disclosure. In addition, in the context, it should be further understood that, when an element is referred to as "above" or "below" another element, it can be directly connected "above" or "below" another element, and can also be indirectly connected "above" or "below" another element through an intermediate element.

An embodiment of the present disclosure provides a photovoltaic power generation system, including a photovoltaic tile and a support. The photovoltaic tile is mounted on ground or a building main body through the support. The building main body includes, but is not limited to, roofs and walls of buildings such as plants and warehouses of production enterprises. The present disclosure is described by taking the roofs as an example.

A specific structure of the photovoltaic tile is shown in FIG. 1. The photovoltaic tile includes a plurality of color steel tiles 1 and a photovoltaic module 2. The photovoltaic module 2 is mounted on the color steel tiles 1. The color steel tiles 1 are mounted on roofs of buildings such as plants and warehouses of production enterprises through the support, so as to facilitate the solar power generation to meet daily usage requirements. The photovoltaic tile has a first direction X, a second direction Y, and a third direction (not marked in the figures) perpendicular to one another. The first direction X is a width direction of the color steel tiles 1, the second direction Y is a height direction of the color steel tiles 1, and the third direction is a length direction of the color steel tiles 1.

A plurality of photovoltaic modules 2 are fixedly connected to one of the color steel tiles 1 along the third direction, and a distance S between adjacent photovoltaic modules 2 satisfies: 10 mm≤S≤50 mm. The distance between the adjacent photovoltaic modules 2 may be 20 mm, 30 mm, or 40 mm. If the distance between the adjacent photovoltaic modules 2 is excessively small (i.e., S≤10 mm), the adjacent photovoltaic modules 2 may shield each other, which leads to reduction in operation efficiency of the photovoltaic modules 2. During mounting, due to mounting and machining errors, problems such as abutment and interference easily occur between the adjacent photovoltaic modules 2, resulting in difficulties in mounting of certain photovoltaic modules. If the distance between the adjacent photovoltaic modules 2 is excessively large (i.e., S>50 mm), the total number of the photovoltaic modules 2 that can be mounted on the color steel tile 1 is reduced, thereby reducing operation efficiency and usability of the photovoltaic tile. Therefore, 10 mm≤S≤50 mm can improve mounting stability of the photovoltaic modules 2 and improve operation stability of the photovoltaic modules 2, thereby improving the operation efficiency and the usability of the photovoltaic tile.

In some embodiments, a distance S between adjacent photovoltaic modules 2 satisfies: 25 mm≤S≤30 mm. The distance between the adjacent photovoltaic modules 2 may be 26 mm, 27 mm, or 29 mm. Therefore, 25 mm≤S≤30 mm can further improve the mounting stability of the photovoltaic modules 2 and further improve the operation stability of the photovoltaic modules 2.

Figure 2:
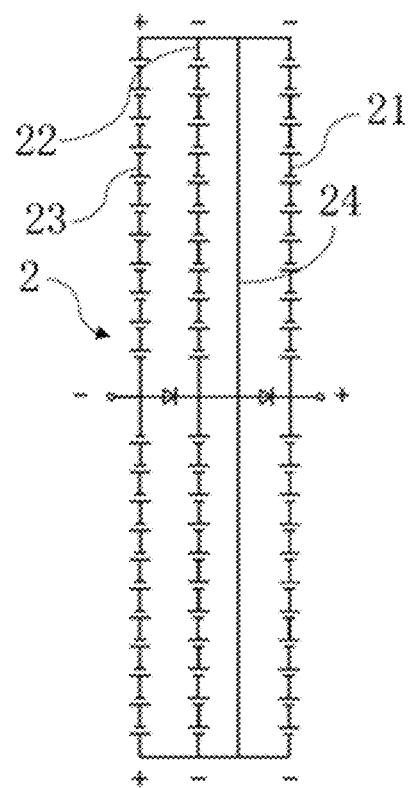
FIG. 2 is a schematic structural diagram of a photovoltaic module in FIG. 1.

As shown in FIG. 2, the photovoltaic module 2 includes a first solar cell string 21, a second solar cell string 22, and a third solar cell string 23, and a jumper wire 24 is arranged between the first solar cell string 21 and the second solar cell string 22 or the second solar cell string 22 and the third solar cell string 23. The first solar cell string 21, the second solar cell string 22, and the third solar cell string 23 are configured to convert light energy into electric energy. The arrangement of the jumper wire 24 between the first solar cell string 21 and the second solar cell string 22 or the second solar cell string 22 and the third solar cell string 23 enables the solar cell string at the very edge to be protected by a diode, reducing a hot spot effect and reducing a possibility of damages to the photovoltaic modules 2 due to overheating.

Figure 3:
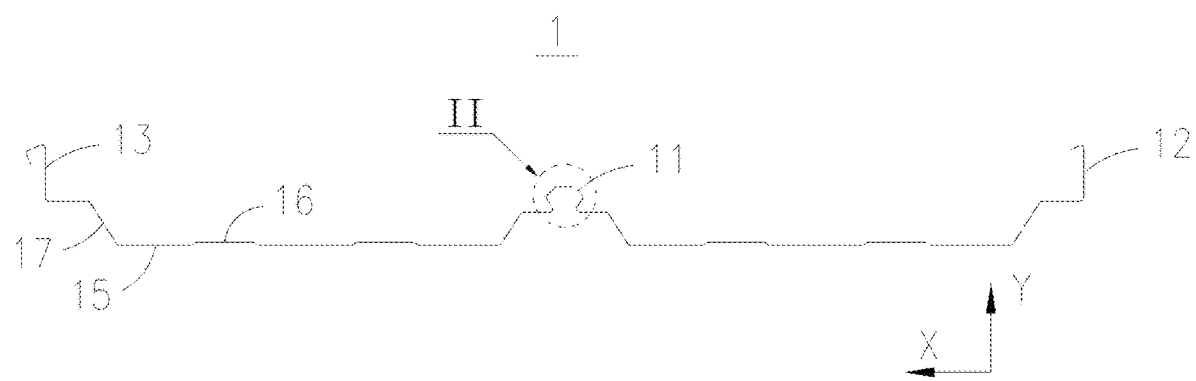
FIG. 3 is a schematic structural diagram of a color steel tile in FIG. 1.

As shown in FIG. 3, the color steel tile 1 includes a male rib 12 and a female rib 13 arranged at two ends along the first direction X. A folding portion 11 protruding upward along the second direction Y is arranged between the male rib 12 and the female rib 13. Along the first direction X, bottom plates 15 are arranged on two sides of the folding portion 11. The bottom plates 15 each have one end connected to the folding portion 11 and the other end connected to the male rib 12 or the female rib 13 through a connection portion 17. The folding portion 11 can improve wind drag performance of the color steel tile 1. The top of the folding portion 11 may be arranged as an arc or a plane, and a width of the plane may range from 0 mm to 30 mm.

The bottom plate 15 is provided with a reinforcing strip 16. When the photovoltaic tile is used in a heavy wind environment, airflow flows through an upper surface of the color steel tile 1, which reduces pressure of the upper surface of the color steel tile 1, so that a pressure difference exists between an upper surface and a lower surface of the bottom plate 15 of the color steel tile 1. In this case, the reinforcing strip 16 and the bottom plate 15 near the reinforcing strip 16 may locally deform under the pressure difference to reduce the risk of failure of connection between adjacent color steel tiles 1, thereby improving stability of connection between the adjacent color steel tiles 1 and between the color steel tiles 1 and the roof.

When the adjacent color steel tiles 1 are fixedly connected, the female rib 13 is lapped on adjacent male ribs 12, and the female rib 13 is fixedly connected to the male ribs 12 on the adjacent color steel tiles 1 by overlocking through an overlocking tool (not shown in the figures), so as to simplify the connection structure of adjacent color steel tiles 1, thereby reducing the space required by the mounting of the color steel tiles 1. An angle α of the overlocking satisfies: 360°≤α≤540°. For example, the angle of the overlocking may be 400°, 450°, or 500°.

In the present disclosure, the angle of the overlocking is a bending angle between the male rib 12 and the female rib 13. If the angle of the overlocking is excessively small (i.e., α<360°), the male rib 12 and the female rib 13 have poor overlocking strength, and the male rib 12 and the female rib 13 are easily separated under external force, resulting in failure of connection between the adjacent color steel tiles 1. If the angle of the overlocking is excessively large (i.e., α>540°), difficulty of the overlocking is increased, which increases the time spent in fixing the adjacent color steel tiles 1. Therefore, 360°≤α≤540° can increase strength of connection between the male rib 12 and the female rib 13, thereby improving stability of the connection between the adjacent color steel tiles 1 and, at the same time, reduce mounting difficulty of the color steel tiles 1 and reduce the mounting duration of the color steel tiles 1.

In some embodiments, the angle α of the overlocking satisfies: α=450°.

In the present disclosure, the angle of the overlocking is 450°, which can further improve the stability of the connection between the adjacent color steel tiles 1 and further reduce the mounting duration of the color steel tiles 1.

Since the female rib 13 is fixedly connected to the male ribs 12 of the adjacent color steel tiles 1 by overlocking, the connecting end 14 formed after the connection of the female rib 13 and the male rib 12 has a connecting gap. If the connecting end 14 is exposed, water may drop on the connecting end 14, then move along a sidewall of the connecting end 14 in rainy or snowy weather, and finally enter the roof through the connecting gap, resulting in leakage of the roof.

Figure 4:
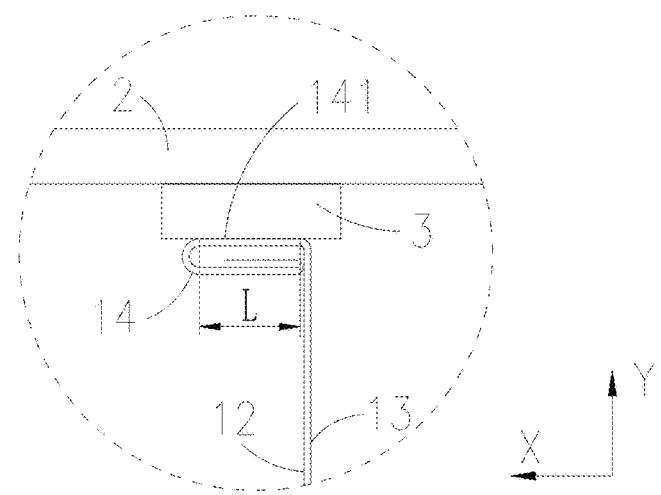
FIG. 4 is an enlarged view of Part I in FIG. 1.

In order to solve the above problem, in some embodiments, as shown in FIG. 4, the connecting end 14 is provided with a connecting plane 141 extending along the first direction X, and along the second direction Y, the connecting gap between the female rib 13 and the male rib 12 is located below the connecting plane 141.

In the present disclosure, since the connecting gap is located below the connecting plane 141, the water on the connecting plane 141 can slide down along the sidewall of the connecting end 14 along the second direction Y and drip down to the bottom plate 15 of the color steel tile 1 under gravity, so as to reduce the risk of the water entering the roof through the connecting gap and improve airtightness of the photovoltaic tile and the roof, thereby improving operation stability of the photovoltaic power generation system.

In some embodiments, as shown in FIG. 1 and FIG. 4, a projection of the connecting end 14 along the third direction may be in the shape of T, L, U, or other alternative structures. During actual manufacturing, the shape of the connecting end 14 may be adjusted as required, so as to improve structural flexibility of the connecting end 14. The specific shape of the connecting end 14 is not specially limited in the present disclosure, and the shape of L is only taken as an example in the drawings for illustration.

In addition, as shown in FIG. 1, the connecting plane 141 is higher than the highest point of the folding portion 11, which reduces the risk of increasing the overlocking difficulty of the male rib 12 and the female rib 13 caused by the small connecting end 14, thereby reducing the difficulty of the connection between the color steel tiles 1 and reducing the mounting duration of the color steel tiles 1.

In some embodiments, as shown in FIG. 1, two ends of the photovoltaic module 2 are respectively connected to the folding portions 11 of the adjacent color steel tiles 1. After the photovoltaic module 2 is connected to the color steel tile 1, the photovoltaic module 2 is located above the connecting end 14 along the second direction Y. In rainy or snowy weather, the water may drip on the photovoltaic module 2 and move above the folding portion 11 along the photovoltaic module 2. Since the folding portion 11 is of a closed structure, the water cannot enter the roof through the folding portion 11. In addition, the photovoltaic module 2 covers the connecting end 14, which reduces the risk of the water entering the roof through the connecting gap, thereby reducing the risk of the leakage of the roof.

As shown in FIG. 1 and FIG. 4, the color steel tile 1 is further provided with a support portion. After the photovoltaic module 2 is connected to the color steel tile 1, the support portion can abut against the photovoltaic module 2, which increases support force of the color steel tile 1 on the photovoltaic module 2, reduces the risk of local downward collapse and deformation of the photovoltaic module 2 along the second direction Y (the collapse and deformation of the photovoltaic module 2 may be caused by its own gravity or external force, such as water, rain, snow, or dust piled on the photovoltaic module 2), thereby improving mounting stability of the photovoltaic module 2, and prolongs the service life of the photovoltaic module 2, thereby improving operation stability of the photovoltaic power generation system.

In some embodiments, the support portion is fixed to the color steel tile 1 as a separate part, so as to facilitate maintenance and replacement of the support portion and also facilitates adjustment of the height of the support portion along the second direction Y, thereby improving the support effect of the support portion on the photovoltaic module 2.

In some other embodiments, the bottom plate 15 of the photovoltaic tile is locally deformed to form the support portion, so as to reduce the space required by the mounting of the support portion.

In some other embodiments, as shown in FIG. 4, the connecting end 14 formed by the connection of the female rib 13 with the male rib 12 on the adjacent color steel tile 1 serves as the support portion, which reduces the space required by the mounting of the support portion, simplifies the structure of the color steel tile 1, and reduces the size of the color steel tile 1, thereby reducing manufacturing costs of the color steel tile 1.

In the present disclosure, description is based on an example in which the support portion is the connecting end 14. As shown in FIG. 3, the connecting plane 141 of the connecting end 14 abuts against the photovoltaic module 2. Along the first direction X, a width L of the connecting plane 141 satisfies: 5 mm≤L≤30 mm. The width of the connecting plane 141 may be 10 mm, 20 mm, or 25 mm.

In some embodiments, if the width of the connecting plane 141 is small (i.e., L<5 mm), a contact surface between the connecting end 14 and the photovoltaic module 2 is small. When the photovoltaic module 2 collapses downward along the second direction Y, a contact part between the photovoltaic module 2 and the connecting end 14 is prone to damages. If the width of the connecting plane 141 is large (i.e., L>30 mm), the connecting end 14 is of a large size, so that the mounting space of the connecting end 14 is increased and costs of the support portion are increased. Therefore, 5 mm≤L≤30 mm can reduce the risk of damages caused by local force on the photovoltaic module 2 and reduce the space required by the mounting of the connecting end 14.

In some embodiments, the width L of the connecting plane 141 satisfies: 10 mm≤L≤20 mm. The width L of the connecting plane 141 may be 13 mm, 17 mm, or 19 mm, to reduce the risk of damages caused by local force on the photovoltaic module 2 and further reduce the size of the connecting plane 141.

In some embodiments, as shown in FIG. 4, the photovoltaic module 2 and/or the connecting end 14 is provided with a partition plate 3. After the photovoltaic module 2 is fixedly connected to the color steel tile 1, the partition plate 3 has one end abutting against the photovoltaic module 2 and the other end abutting against the connecting plane 141 of the connecting end 14, that is, the photovoltaic module 2 is connected to the connecting plane 141 through the partition plate 3. The risk of damages to the photovoltaic module 2 caused by direct contact of the connecting end 14 with the photovoltaic module 2 is reduced, thereby improving operation stability of the photovoltaic module 2 and prolonging the service life of the photovoltaic module 2.

Along the third direction, a length of the partition plate 3 is the same as that of the photovoltaic module 2, so as to increase support and protection effects of the partition plate 3 on the photovoltaic module 2. Alternatively, one photovoltaic module 2 is provided with a plurality of partition plates 3. The number of the partition plates 3 may be 2 to 10. In some embodiments, 3 to 5 partition plates 3 are provided to simplify the operation of mounting the partition plates 3 and reduce the time required by the mounting of the partition plates 3. When a plurality of partition plates 3 are provided and the plurality of partition plates 3 disposed on the photovoltaic module 2 at intervals, the partition plates 3 each have a length ranging from 100 mm to 500 mm along the third direction. The partition plates 3 each have a length ranging from 200 mm to 400 mm, to facilitate machining and mounting of the partition plates 3.

In addition, the width of the partition plate 3 along the first direction X is no less than the width of the connecting plane 141, which reduces the size of the connecting end 14 and increases a contact area of the photovoltaic module 2 and the partition plate 3, thereby improving operation stability of the connecting end 14, and reduces the risk of damages caused by local force on the photovoltaic module 2, thereby further prolonging the service life of the photovoltaic module 2.

In addition, as shown in FIG. 1, the photovoltaic tile further includes a fixing device 4. The photovoltaic module 2 is mounted on the folding portion 11 through the fixing device 4, to simplify a manner of connecting the photovoltaic module 2 and the folding portion 11 and reduce the number of parts required when the photovoltaic module 2 is mounted on the folding portion 11, thereby reducing the mounting space of the photovoltaic module 2 and increasing space utilization of the color steel pile 1.

Along the third direction, a plurality of fixing devices 4 are provided, and the plurality of fixing devices 4 are evenly distributed on an edge of the photovoltaic module 2.

In this embodiment, when the photovoltaic module 2 is connected to the fixing devices 4, the fixing devices 4 may exert force on the photovoltaic module 2, and the even distribution of the fixing devices 4 causes the photovoltaic module 2 to be stressed evenly, which reduces the risk of deformation and damages caused by local force on the photovoltaic module 2, thereby improving operation stability of the photovoltaic module 2 and prolonging the service life of the photovoltaic module 2.

The number N of the fixing devices 4 on one photovoltaic module 2 satisfies: $4 \leq N \leq 12$.

In some embodiments, $4 \leq N \leq 12$. After the photovoltaic module 2 is connected to the fixing devices 4, along the second direction Y, a top surface of the photovoltaic module 2 away from the color steel tile 1 may carry a load with pressure greater than 7000 Pa, and a bottom surface of the photovoltaic module 2 towards the color steel tile 1 may carry a load with pressure greater than 2400 Pa. Therefore, if the number of the fixing devices 4 is no less than four (i.e., $4 \leq N$), stability of the connection between the fixing devices 4 and the photovoltaic module 2 is increased. If the number of the fixing devices 4 is no less than twelve (i.e., $N \leq 12$), the number of the fixing devices 4 is reduced, thereby reducing the space of the color steel tile 1 occupied by the mounting of the fixing devices 4, reducing overall weight of the photovoltaic tile, and increasing scenarios to which the photovoltaic tile is applicable.

Figure 6:
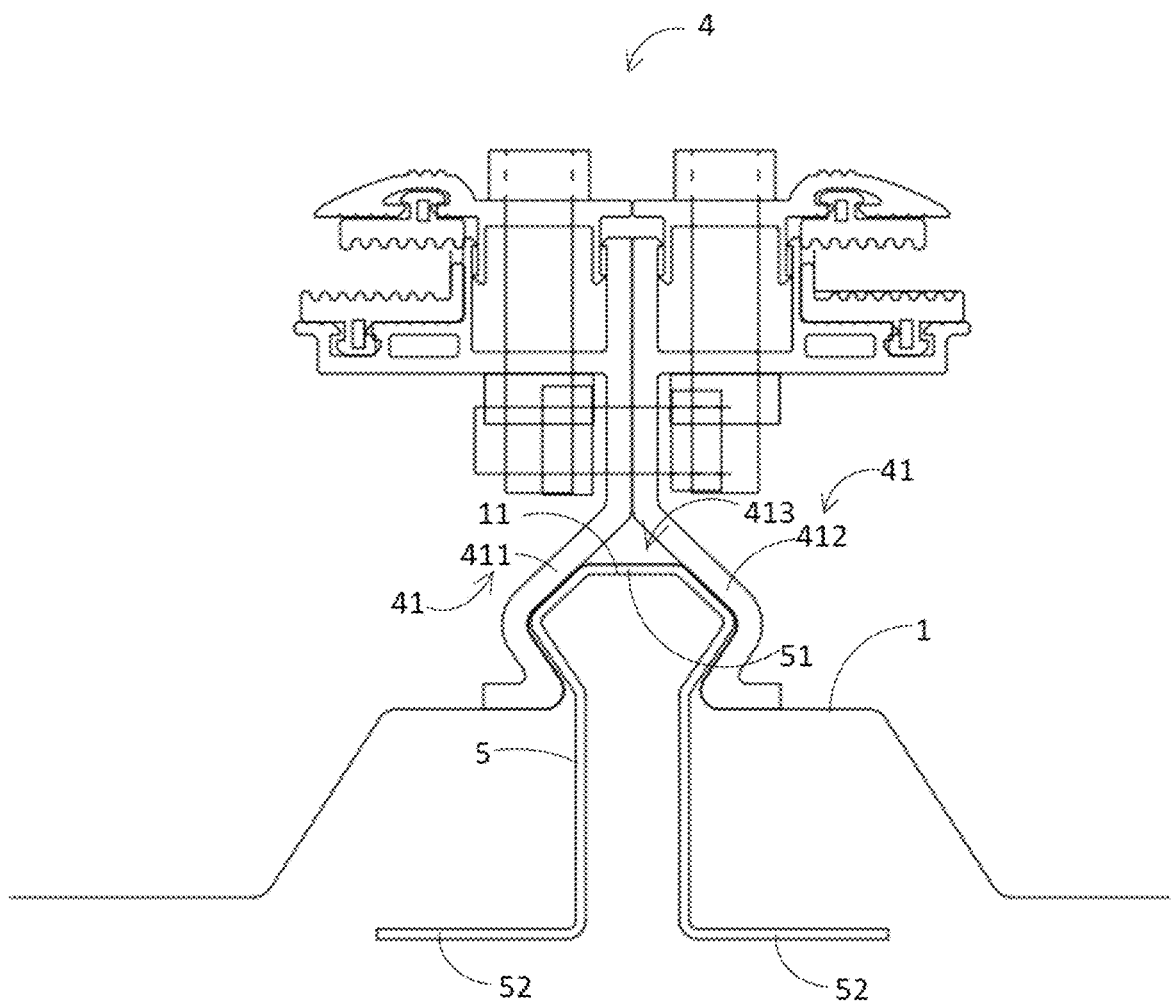
FIG. 6 is a schematic structural diagram showing connection of the color steel tile with a fixing device and a first support in FIG. 1.
Figure 7:
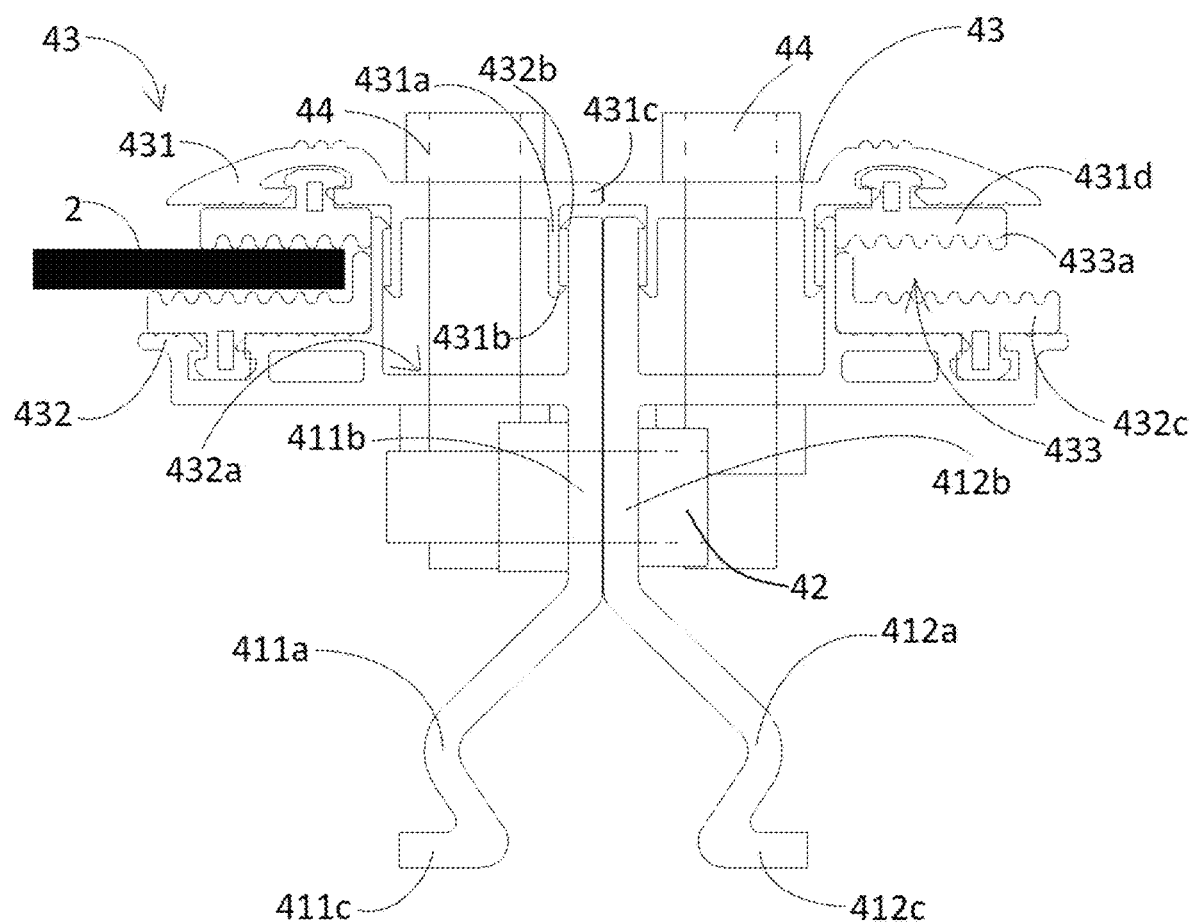
FIG. 7 is a schematic structural diagram showing connection between the fixing device and the photovoltaic module in FIG. 1.

A specific structure of the fixing device 4 is shown in FIG. 6 and FIG. 7. The fixing device 4 includes a first clamping portion 41 configured to clamp the folding portion 11 and a second clamping portion 43 configured to clamp the photovoltaic module 2. The fixing device 4 is provided with both the first clamping portion 41 and the second clamping portion 43, that is, the fixing device 4 can implement the function of simultaneously clamping the color steel tile 1 and the photovoltaic module 2, so as to mount the photovoltaic module 2 to a building such as a rooftop.

In the related art, a large number of purlins are adopted in a rooftop photovoltaic power station of the color steel tile 1, the purlins are fixed to the rooftop of a building, the color steel tile 1 is mounted on the purlins through a fixture, and the photovoltaic module 2 is generally mounted on the purlins through a block pressing means. In this mounting manner, a large number of purlins, fixtures, block pressing means, etc. are required, thereby increasing material costs. At the same time, in this mounting manner, procedures are complicated, and labor costs are increased. In the present disclosure, the fixing device 4 is integrated with the first clamping portion 41 and the second clamping portion 43, so that the fixing device 4 can simultaneously clamp the photovoltaic module 2 and the color steel tile 1, and then the photovoltaic module 2 can be mounted on the color steel tile 1 through the fixing device 4. This mounting manner helps to reduce the use of purlins and other devices, thereby helping to reduce material and labor costs.

The fixing device 4 in the embodiments of the present disclosure can provide large clamping force on the photovoltaic module 2, and is suitable for the photovoltaic module 2 with a large size, such as the 210 photovoltaic module 2, so as to help to improve reliability of the clamping of the photovoltaic module 2 with a large size and further improve the stability of the mounting of the photovoltaic module 2.

In some embodiments, as shown in FIG. 6, the first clamping portion 41 includes a first clamping body 411 and a second clamping body 412 arranged opposite to each other along the first direction X. The first clamping body 411 and the second clamping body 412 can clamp the folding portion 11, so that the fixing device 4 is mounted on the folding portion 11.

The fixing device 4 clamps the folding portion 11 through the first clamping body 411 and the second clamping body 412, which simplifies the manner of connecting the fixing device 4 and the folding portion 11, simplifies the structure of the fixing device 4, reduces the size of the fixing device 4, reduces manufacturing costs of the fixing device 4, and reduces the space required by the mounting of the fixing device 4, thereby increasing space utilization of the color steel tile 1.

Figure 5:
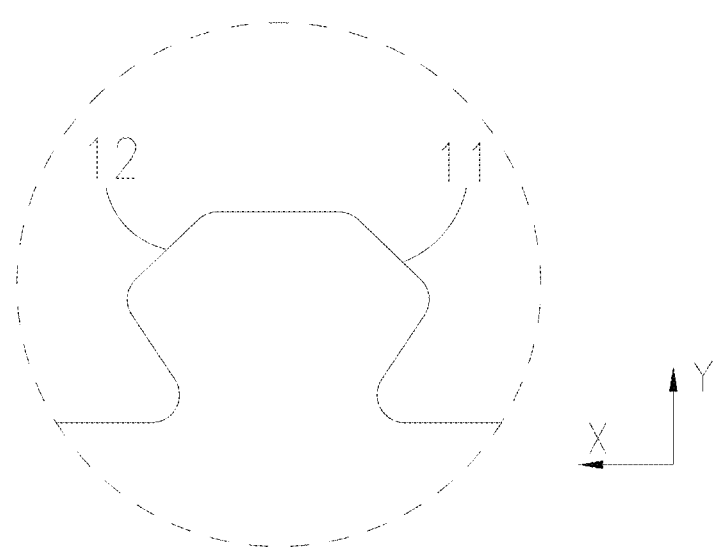
FIG. 5 is an enlarged view of Part II in FIG. 2.

In some embodiments, as shown in FIG. 6 and FIG. 7, the first clamping body 411 includes a first bending structure 411a, the second clamping body 412 includes a second bending structure 412a, and the first bending structure 411a and the second bending structure 412a define a first clamping space 413. As shown in FIG. 5, the folding portion 11 includes a first sidewall 111 and a second sidewall 112 arranged opposite to each other along the first direction X. When the fixing device 4 is connected to the folding portion 11, a part of the folding portion 11 is located in the first clamping space 413, the first sidewall 111 abuts against the first bending structure 411a, and the second sidewall 112 abuts against the second bending structure 412a. At the same time, an outer contour of the first bending structure 411a matches the first sidewall 111, and an outer contour of the second bending structure 412a matches the second sidewall 112, so as to improve stability of connection between the first clamping body 411 and the first sidewall 111 and between the second clamping body 412 and the second sidewall 112.

In some embodiments, as shown in FIG. 6 and FIG. 7, the first clamping body 411 further includes a first extension portion 411b extending along the second direction Y, the first extension portion 411b is connected to the first bending structure 411a, the second clamping body 412 further includes a second extension portion 412b extending along the second direction Y, and the second extension portion 412b is connected to the second bending structure 412a. The fixing device 4 further includes a first fastener 42, and the first extension portion 411b is connected to the second extension portion 412b through the first fastener 42. The first fastener 42 may be a screw, a bolt, or other connection structures. The specific type and structure of the first fastener 42 are not specially limited in the present disclosure.

When the first fastener 42 is not fixedly connected to the first extension portion 411b and the second extension portion 412b, the first extension portion 411b and the second extension portion 412b can elastically deform along the first direction X. In this case, the first clamping body 411 can move along the first direction X to a direction away from the second clamping body 412. The second clamping body 412 can move along the first direction X to a direction away from the first clamping body 411, so that the first clamping space 413 is increased, so as to facilitate extension of a part of the folding portion 11 into the first clamping space 413. When the first fastener 42 is fixedly connected to the first extension portion 411b and the second extension portion 412b, the first clamping body 411 and the second clamping body 412 cannot move along the first direction X, so as to clamp the folding portion 11, so that the fixing device 4 is fixedly connected to the folding portion 11. Thus, the arrangement of the first fastener 42 simplifies operations of mounting and disassembling the fixing device 4 on the folding portion 11, and simplifies the structure of the first clamping portion 41, thereby simplifying the structure of the fixing device 4.

At the same time, the first extension portion 411b and the second extension portion 412b play a role in elevating the second clamping portion 43, thereby reducing the possibility of interference between the photovoltaic module 2 and the male rib 12 and the female rib 13 of the color steel tile 1 when the second clamping portion 43 clamps the photovoltaic module 2.

As shown in FIG. 6 and FIG. 7, the first clamping body 411 includes a third extension portion 411c, the third extension portion 411c is located at the end of the first bending structure 411a close to the color steel tile 1. That is, the third extension portion 411c is located at the end of the first bending structure 411a away from the first extension portion 411b, and has a preset angle with the first bending structure 411a. The second clamping body 412 includes a fourth extension portion 412c, the fourth extension portion 412c is located at the end of the second bending structure 412a close to the color steel tile 1. That is, the fourth extension portion 412c is located at the end of the second bending structure 412a away from the second extension portion 412b, and has a preset angle with the second bending structure 412a. The third extension portion 411c and the fourth extension portion 412c are both configured to abut against the color steel tile 1.

When the first clamping portion 41 clamps the folding portion 11, both the third extension portion 411c and the fourth extension portion 412c can abut against a sidewall of the color steel tile 1, so as to help to improve stability of the mounting between the fixing device 4 and the color steel tile 1 and help to implement the clamping effect of the first clamping portion 411 on the folding portion 11, thereby helping to improve the reliability of the connection between the folding portion 11 and the first support 5.

Along the first direction X, the fixing device 4 is provided with one second clamping portion 43, so that the fixing device 4 can clamp one photovoltaic module 2. Alternatively, the fixing device 4 is provided with two second clamping portions 43, and the two second clamping portions 43 are symmetrically arranged on two sides of the first clamping portion 41 along the first direction X, so that the fixing device 4 can simultaneously clamp two photovoltaic modules 2.

In an embodiment, as shown in FIG. 6 and FIG. 7, the second clamping portion 43 of the fixing device 4 is arranged on the first clamping body 411 and/or the second clamping body 412, the second clamping portion 43 being provided with a first clip 431 and a second clip 432 arranged along the second direction Y, and the first clip 431 and the second clip 432 are configured to clamp the photovoltaic module 2.

The fixing device 4 clamps the photovoltaic module 2 through the first clip 431 and the second clip 432, which simplifies the manner of connecting the fixing device 4 and the photovoltaic module 2, simplifies the structure of the fixing device 4, reduces the size of the fixing device 4, reduces manufacturing costs of the fixing device 4, and reduces a space required by the mounting of the fixing device 4, thereby increasing the space utilization of the color steel tile 1.

As shown in FIG. 6 and FIG. 7, the fixing device 4 further includes a second fastener 44, and the first clip 431 is connected to the second clip 432 through the second fastener 44. The second fastener 44 may be a screw, a bolt, or other connection structures. The specific type and structure of the second fastener 44 are not specially limited in the present disclosure.

When the second fastener 44 is not fixedly connected to the first clip 431 and the second clip 432, the first clip 431 can move along the second direction Y to a direction away from the second clip 432, so as to increase the size of the second clamping space 433 between the first clip 431 and the second clip 432, thereby facilitating extension of a part of the photovoltaic module 2 into the second clamping space 433. When the second fastener 44 is fixedly connected to the first clip 431 and the second clip 432, the first clip 431 cannot move along the second direction Y, so as to clamp the photovoltaic module 2, so that the fixing device 4 is fixedly connected to the photovoltaic module 2. Thus, the arrangement of the second fastener 44 simplifies operations of mounting and disassembling the fixing device 4 on the photovoltaic module 2, and simplifies the structure of the second clamping portion 43, thereby simplifying the structure of the fixing device 4.

As shown in FIG. 7, the first clip 431 includes a first limit portion 431a, the first limit portion 431a extends towards a direction close to the second clip 432, the first limit portion 431a is provided with a first protrusion 433a portion 431b, the second clip 432 is provided with a groove 432a, and a sidewall on at least one side of the groove 432a is provided with a second protrusion 433a portion 432b. When the second clamping portion 43 clamps the photovoltaic module 2, the first protrusion 433a portion 431b can abut against the second protrusion 433a portion 432b to limit the position of the first clip 431.

When the second clamping portion 43 clamps the photovoltaic module 2, the first clip 431 may move relative to the second clip 432. When the first protrusion 433a portion 431b can match with the second protrusion 433a portion 432b, the first clip 431 cannot continue moving towards a direction away from the second clip 432, so as to limit the position of the first clip 431, thereby reducing the possibility of falling off of the first clip 431 from the fixing device 4. In some embodiments, the groove 432a may be provided with the second protrusion 433a portion 432b on two sides, and the first clip 431 is provided with two first limit portions 431a, so as to further limit the position of the first clip 431.

As shown in FIG. 7, the first clip 431 includes a second limit portion 431c. When the second clamping portion 43 clamps the photovoltaic module 2, along the second direction Y, a bottom wall of the second limit portion 431c can abut against a top wall of the groove 432a to limit the position of the first clip 431.

When the first clip 431 moves close to the second clip 432, the second limit portion 431c can limit the position of the first clip 431. That is, when the second limit portion 431c abuts against the top wall of the groove 432a, the second limit portion 431c cannot continue moving towards a direction close to the second clip 432. Such arrangement also helps to improve the stability of the mounting of the first clip 431 while limiting the position of the first clip 431.

As shown in FIG. 7, a first cushioning member 431d is mounted on the first clip 431, and a second cushioning member 432c is mounted on the second clip 432. After the photovoltaic module 2 is connected to the second clamping portion 43, the first clip 431 and the second clip 432 clamp the photovoltaic module 2 through the first cushioning member 431d and the second cushioning member 432c, which reduces the risk of abrasion of and damages to the photovoltaic module 2 caused by direct contact of the first clip 431 and the second clip 432 with the photovoltaic module 2, ensures stability of the mounting of the photovoltaic module, improves operation stability of the photovoltaic module 2, and prolongs the service life of the photovoltaic module.

As shown in FIG. 7, a plurality of protrusions 433a are successively arranged on a top wall and a bottom wall of the second clamping space 433. The protrusions 433a are configured to abut against the photovoltaic module 2.

A plurality of protrusions 433a being successively arranged on a top wall and a bottom wall of the second clamping space 433, that is, a plurality of successive protrusions 433a are arranged on the sides of the first cushioning member 431d and the second cushioning member 432c abutting against the photovoltaic module 2. Such arrangement helps to improve friction between the first cushioning member 431d, the second cushioning member 432c and the photovoltaic module 2, thereby helping to improve stability of the clamping of the second clamping portion 43 and improving stability of the mounting of the photovoltaic module 2.

As shown in FIG. 1, the support includes a first support 5. The first support 5 has one end fixedly connected to the roof and the other end located on the folding portion 11 of the color steel tile 1 to mount the color steel tile 1 on the roof. The first support 5 includes a bending portion 51 and a first mounting portion 52. The bending portion 51 may extend into the folding portion 11. For example, the bending portion 51 can match with the folding portion 11, that is, the bending portion 51 can abut against an inner wall of the folding portion 11, so as to help to improve the reliability of connection between the folding portion 11 and the first support 5 and reduce the possibility of falling off the bending portion 51 from the folding portion 11. Two ends of the bending portion 51 may be connected to the first mounting portion 52, and the first mounting portion 52 is connected to the roof by threading, so that the first support 5 is fixed to the roof and then the color steel tile 1 can be connected to the roof through the first support 5. The first support has one end fixedly connected to the roof through a screw and the other end extending into the folding portion 11. Under the action of the fixing device 4 of the color steel tile 1, the folding portion 11 may be located in the first clamping space 413. Therefore, the first clamping portion 41 may clamp the first support 5 and the folding portion 11, that is, strengthen and fix the connection between the first support 5 and the folding portion 11, so as to improve stability and reliability of the connection.

In the related art, the stability of the connection between the color steel tile 1 and the support is low, and the color steel tile 1 has poor wind drag performance. As a result, the color steel tile 1 is easily detached from the roof under wind pressure, which cannot be used normally and brings safety risk. Compared with the related art, in the embodiments of the present disclosure, through the clamping of the fixing device 4, the joint between the color steel tile 1 and the first support 5 is fixed and strengthened. That is, the stability of the connection between the folding portion 11 and the first support 5 is strengthened, so that the connection is firmer, thereby helping to improve wind drag performance of the color steel tile 1 and helping to improve security of use.

Figure 8:
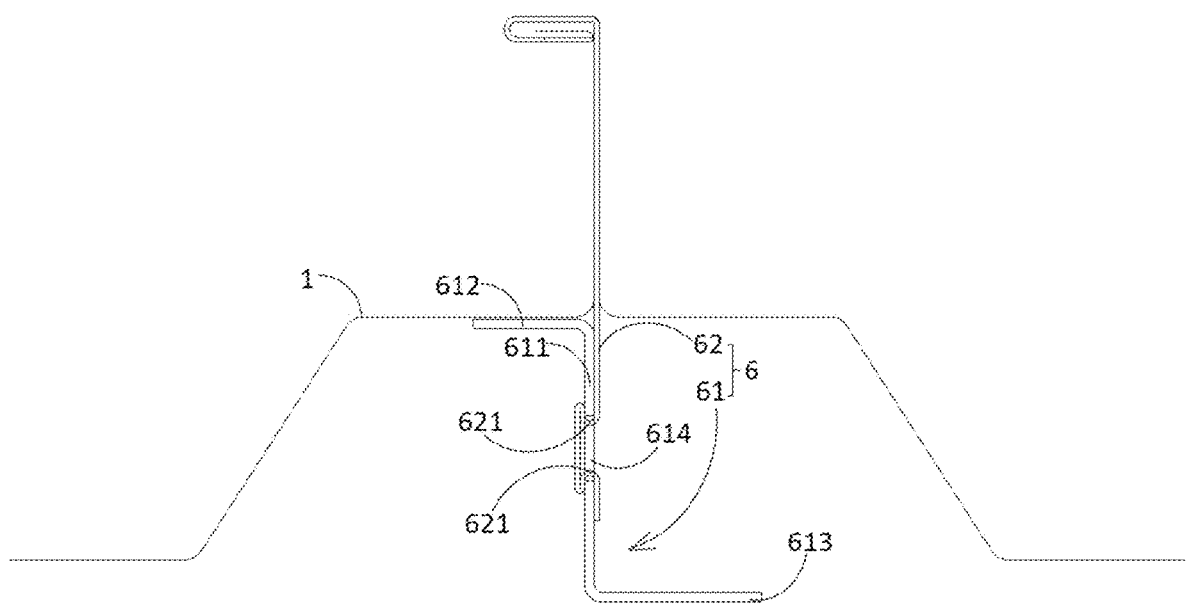
FIG. 8 is a schematic structural diagram of connection between the color steel tile and a second support in FIG. 1.

As shown in FIG. 1 and FIG. 8, the support includes a second support 6. The second support 6 has one end fixedly connected to the connecting end 14 of the color steel pile 1 and the other end fixedly connected to the roof to mount the color steel tile 1 on the roof. The second support 6 includes a fixing bracket 61 and a second mounting portion. The fixing bracket 61 includes a main body portion 611, a first extension end 612, and a second extension end 613. The main body portion 611 has one end connected to the first extension end 612 and the other end connected to the second extension end 613. The first extension end 612 can abut against an inner wall of the color steel tile 1, which helps to support the color steel tile 1. The second extension end 613 can be connected to the roof by threading, so as to fix the second support 6 to the roof. The second mounting portion has one end connected to the fixing bracket 61 and the other end connected to the male rib 12 and the female rib 13 by overlocking. The main body portion 611 is provided with a chute 614, and a matching slot 621 of the second mounting portion 62 can match with a sidewall of the chute 614 and slide along the chute 614. That is, the second mounting portion is connected to the fixing bracket 61 through the matching slot 621, and the sidewall of the chute 614 can extend into the matching slot 621. The second mounting portion 62 is provided with two matching slots 621. The two matching slots 621 match with sidewalls on two sides of the chute 614 respectively. When the color steel tile 1 is affected by an ambient temperature and leads to deformation, the color steel tile 1 can slide relative to the chute 614 through the second mounting portion 62, so as to help to compensate the stress caused by the deformation of the color steel tile 1 and reduce the possibility of damages to the color steel tile 1, thereby helping to prolong the service life of the color steel tile 1.

Based on the above photovoltaic tile, embodiments of the present disclosure further provide a method for mounting photovoltaic tile, which includes the following steps.

In S1, the female rib 13 of one of adjacent color steel tiles 1 is lapped on the male rib 12 of the other of the adjacent color steel tiles 1, which jointly bend one or more times through an overlocking means to form a connecting end 14. Through joint crimping of the male rib 12 and the female rib 13, the male rib 12 and the female rib 13 are connected to each other, so that the adjacent color steel tiles 1 are connected and the connecting end can support the photovoltaic module 2.

In S2, the fixing devices 4 are on adjacent folding portions 11 respectively. The fixing devices 4 are mounted on the folding portions 11 by clamping, and the clamping of the fixing devices 4 with the folding portions 11 can improve strength of folding, thereby improving overall wind drag performance of the color steel tile 1.

In S3, the photovoltaic modules 2 are mounted on adjacent fixing devices 4, and two adjacent fixing devices 4 clamp two ends of the photovoltaic module 2 respectively, so that the photovoltaic modules 2 are stably connected to the color steel tiles 1.

In some embodiments, the male ribs 12 and the female ribs 13 on edges of adjacent color steel tiles 1 are mutually bent, crimped, and connected to form the connecting ends, there is no need to fixedly connect the color steel tiles 1 through other members, which saves costs and reduces the risk of water leakage. The connecting ends can also support the photovoltaic modules 2. The mounting of the fixing devices 4 on the folding portions 11 can also improve the stability of the color steel tiles 1.

When the adjacent color steel tiles 1 are connected, step S1 further includes the following step.

In S11, a second support 6 of a roof and the male rib 12 and the female rib 13 are jointly bent and connected to form the connecting end 14.

The male rib 12 and the female rib 13 adjacent to each other and the second support 6 are jointly bent, crimped, and connected, and the other end of the second support 6 is fixedly connected to the roof, so that the color steel tiles 1 are fixedly connected to the roof. When the outdoor ambient temperature changes, the color steel tiles 1 may also expand when heated and contract when being cooled. When volumes and shapes of the color steel tiles 1 change due to an outside temperature, jointly crimped parts of the second support 6 and the color steel tiles 1 can slide relatively, thereby eliminating the stress and improving the stability of the connection of the color steel tiles 1.

When the adjacent color steel tiles 1 are connected, step S1 further includes the following step.

In S12, one end of a first support 5 of the roof is clamped with the folding portion 11, and the other end of the first support 5 is fixedly connected to the roof.

One end of the first support 5 can be embedded into and clamped with the folding portion 11, the first support 5 is fixed to the roof through screws, and then the first support 5 is fixed to and clamped with the folding portion 11 through the fixing device 4.

The above are merely preferred embodiments of the present disclosure and are not intended to limit the present disclosure. For those skilled in the art, the present disclosure may be subject to various changes and variations. Any modification, equivalent replacement, improvement, and the like made within the spirit and principles of the present disclosure shall fall within the protection scope of the present disclosure.

What is claimed is:

1. A photovoltaic tile, comprising:

a plurality of color steel tiles, wherein adjacent color steel tiles are fixedly connected to each other, each of the plurality of color steel tiles comprising a male rib, a female rib, and a folding portion, the male rib and the female rib respectively arranged at two opposite ends of each color steel tile along a width direction, the folding portion arranged between the male rib and the female rib, and the female rib fixedly connected to the male rib of an adjacent color steel tile to form a connecting end;

fixing devices mounted on the folding portion of each color steel tile; and photovoltaic modules each having two ends respectively connected to the fixing devices of adjacent folding portions, wherein when one of the photovoltaic modules is mounted on one of the plurality of color steel tiles, the connecting end of the one of the color steel tiles supports the one of the photovoltaic modules, wherein each of the fixing devices comprises a first clamping portion including a first clamping body and a second clamping body arranged opposite to each other along the width direction of the plurality of color steel tiles, and the first clamping body and the second clamping body are configured to clamp the folding portion such that one of the fixing devices is mounted on the folding portion, wherein the first clamping body comprises a first bending structure, the second clamping body comprises a second bending structure, and the first clamping body and the second clamping body enclose a first clamping space, wherein the folding portion comprises a first sidewall and a second sidewall arranged opposite to each other along the width direction of the plurality of color steel tiles, and wherein, when one of the fixing devices is connected to the folding portion, a part of the folding portion is located in the first clamping space, the first bending structure abuts the first sidewall, and the second bending structure abuts the second sidewall.

2. The photovoltaic tile according to claim 1, wherein the connecting end is provided with a connecting plane extending along the width direction of the plurality of color steel tiles, and when one of the photovoltaic modules is mounted on one of the plurality of color steel tiles, the connecting plane is connected to one of the photovoltaic modules.

3. The photovoltaic tile according to claim 2, wherein a width L of the connecting plane satisfies: 5 mm≤L≤30 mm.

4. The photovoltaic tile according to claim 2, wherein the female rib is fixedly connected to the male rib of an adjacent color steel tile by an overlocking, and wherein an angle a of the overlocking satisfies: $360°≤\alpha≤540≤°$.

5. The photovoltaic tile according to claim 1, wherein, along a length direction of the plurality of color steel tiles, a projection of the connecting end is in a T shape, an L shape, or a U shape.

6. The photovoltaic tile according to claim 1, further comprising a partition plate arranged between each photovoltaic module and a corresponding color steel tile, wherein the partition plate is mounted on each photovoltaic module or the corresponding color steel tile.

7. The photovoltaic tile according to claim 1, wherein an outer contour of the first bending structure matches an outer contour of the first sidewall, and an outer contour of the second bending structure matches an outer contour of the second sidewall.

8. The photovoltaic tile according to claim 1, wherein the first clamping body further comprises a third extension portion located on a side of the first bending structure adjacent to one of the plurality of color steel tiles, and the third extension portion and the first bending structure jointly form a preset angle,
wherein the second clamping body further comprises a fourth extension portion located on a side of the second bending structure adjacent to the one of the plurality of color steel tiles, and the fourth extension portion and the second bending structure jointly form a preset angle, and
wherein, when one of the fixing devices is connected to the folding portion, the third extension portion and the fourth extension portion abut the one of the plurality of color steel tiles.

9. The photovoltaic tile according to claim 1, wherein the first clamping body further comprises a first extension portion extending along a height direction of the plurality of color steel tiles, and the second clamping body further comprises a second extension portion extending along the height direction of the plurality of color steel tiles, and wherein each fixing device further comprises a first fastener, and the first extension portion is connected to the second extension portion through the first fastener.

10. The photovoltaic tile according to claim 1, wherein each fixing device further comprises a second clamping portion arranged on the first clamping body and/or the second clamping body, the second clamping portion is provided with a first clip and a second clip arranged along a height direction of the plurality of color steel tiles, and the first clip and the second clip are configured to clamp a corresponding one of the photovoltaic modules, and wherein each fixing device further comprises a second fastener, and the first clip is connected to the second clip through the second fastener.

11. The photovoltaic tile according to claim 1, wherein each of the photovoltaic modules comprises a first solar cell string, a second solar cell string, a third solar cell string, and a jumper wire arranged between the first solar cell string and the second solar cell string or between the second solar cell string and the third solar cell string.

12. A photovoltaic power generation system, comprising:
a photovoltaic tile comprising:
a plurality of color steel tiles, wherein adjacent color steel tiles are fixedly connected to each other, each of the plurality of color steel tiles comprising a male rib, a female rib, and a folding portion, the male rib and the female rib respectively arranged at two opposite ends of each color steel tile along a width direction, the folding portion arranged between the male rib and the female rib, and the female rib fixedly connected to the male rib of an adjacent color steel tile to form a connecting end;
fixing devices mounted on the folding portion of each color steel tile;
photovoltaic modules each having two ends respectively connected to the fixing devices of adjacent folding portions,
wherein when one of the photovoltaic modules is mounted on one of the plurality of color steel tiles, the connecting end of the one of the color steel tiles supports the one of the photovoltaic modules;

a first support comprising one end fixedly connected to ground or a building main body and another end connected to the folding portion of the one of the color steel tiles to mount the photovoltaic tile on the ground or the building main body; and
a fixing device connected to a side of the folding portion away from the first support along a thickness direction of the plurality of color steel tiles, the fixing device configured to clamp a joint of the first support and the folding portion,
wherein each of the fixing devices comprises a first clamping portion including a first clamping body and a second clamping body arranged opposite to each other along the width direction of the plurality of color steel tiles, and the first clamping body and the second clamping body are configured to clamp the folding portion such that one of the fixing devices is mounted on the folding portion,
wherein the first clamping body comprises a first bending structure, the second clamping body comprises a second bending structure, and the first clamping body and the second clamping body enclose a first clamping space,
wherein the folding portion comprises a first sidewall and a second sidewall arranged opposite to each other along the width direction of the plurality of color steel tiles, and
wherein, when one of the fixing devices is connected to the folding portion, a part of the folding portion is located in the first clamping space, the first bending structure abuts the first sidewall, and the second bending structure abuts the second sidewall.

13. The photovoltaic power generation system according to claim 12, wherein the first support comprises a bending portion and a first mounting portion, the first support is connected to the folding portion through the bending portion, and the first support is connected to the ground or the building main body through the first mounting portion, and
wherein, when the first support is connected to one of the plurality of color steel tiles, at least a part of the bending portion is located in the folding portion and abuts an inner wall of the folding portion.

14. The photovoltaic power generation system according to claim 12, wherein each of the plurality of color steel tiles comprises a male rib and a female rib, the male rib and the female rib respectively arranged at two opposite ends of each color steel tile along a width direction, and the female rib is fixedly connected to the male rib of an adjacent color steel tile to form a connecting end,
wherein the photovoltaic power generation system further comprises a second support, the second support comprises one end fixedly connected to the connecting end and another end fixedly connected to the ground or the building main body,
wherein the second support comprises a fixing bracket and a second mounting portion, the fixing bracket is configured to be connected to the ground or the building main body, and the second mounting portion comprises one end connected to the building main body and another end fixedly connected to the male rib and the female rib by an overlocking, and
wherein the second mounting portion is movably connected to the fixing bracket.

* * * * *